Figure 1:
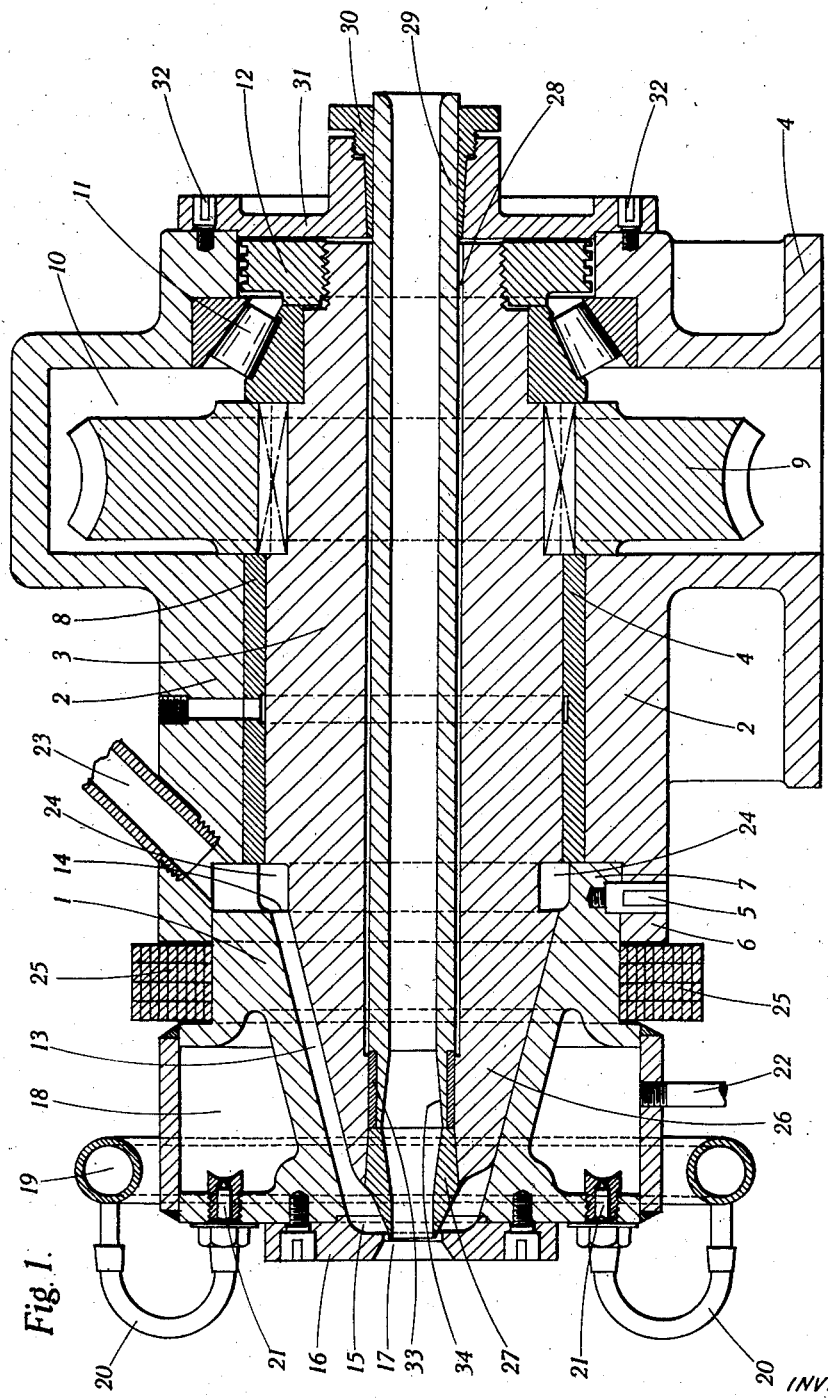

INVENTOR
RICHARD GLEAVE NORRIS

ATTORNEYS

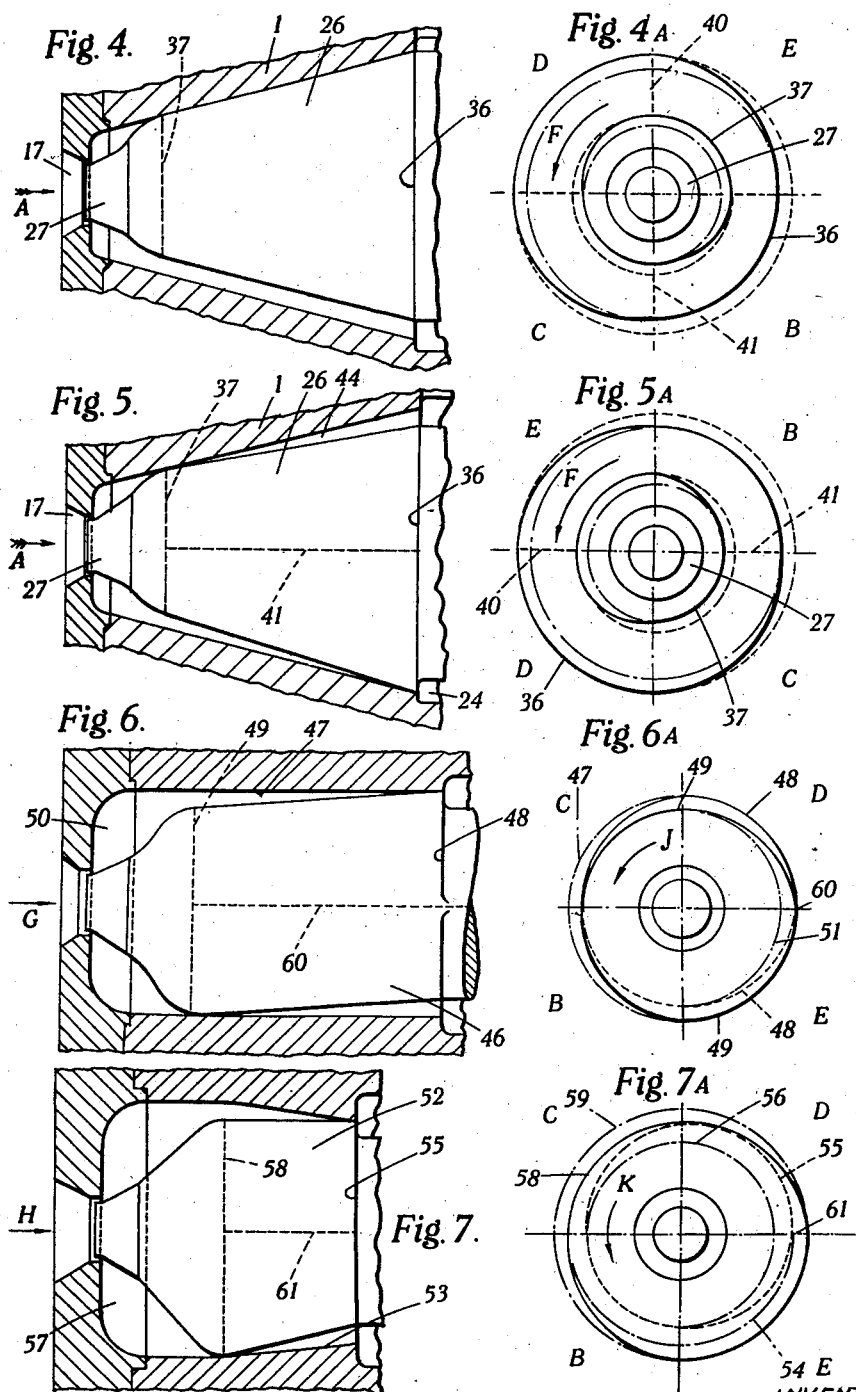

Patented Jan. 3, 1939

2,142,526

UNITED STATES PATENT OFFICE 2,142,526

EXTRUSION MACHINE

Richard Gleave Norris, Huyton, England

Application June 21, 1938, Serial No. 214,900
In Great Britain November 23, 1936

4 Claims. (Cl. 207—2)

This invention concerns machines adapted for the extrusion of plastic material. The invention is particularly concerned with an improved machine adapted for the continuous production of extruded sections in comparatively long lengths.

The improved machine is of the kind in which plastic material is continuously extruded from a chamber, through a die located at the forward end thereof, by a relative rotation of the chamber wall and a member located therein. The invention concerns the form and relative disposition of the chamber and the member therein. The member does not occupy the whole of the volume of the chamber. There is a relatively narrow space between the member and the wall of the chamber over a large part of the surface of the member and the chamber wall and the member are in contact along a line or surface which moves round progressively relative either to the chamber wall or to the member as the relative rotation takes place. At the rearward end of the chamber, the end of the line of contact or of the leading edge of the surface of contact projects in the direction of its progressive movement in advance of that end thereof which is in the forward part of the chamber. The chamber wall and surface of the member are inclined to each other at a small angle as they approach the line of contact or leading edge of the surface of contact.

The effect of the relative rotation of the chamber wall and the member is to produce a squeezing action upon the plastic material located between the converging surfaces during the progressive movement of the line or surface of contact. The squeezing action produces a continuous displacement of plastic material in a forward direction towards a suitable die through which it is ultimately extruded in an uninterrupted length having a sectional shape dependent upon the shape of the die. Material is continuously fed into the chamber at the rearward end to replace that which is extruded. The material may be fed in molten form into a suitably shaped cavity formed in the rear portion of the extrusion chamber outside the relatively narrow space between the chamber wall and the member. The molten metal moves forward therefrom to replace extruded material and suitable temperature controlling means are provided to cool the metal and maintain it in the plastic condition necessary for the purpose of extrusion.

The extrusion pressure generated in the extrusion chamber acts always in a forward direction and there is no pressure acting against the entry of fresh material at the rear of the chamber. In consequence, there is no pressure tending to force the material into any of the apparatus which may be located behind the extrusion chamber, thereby eliminating the need for special sealing arrangements or of special bearings between any relatively moving parts of the apparatus.

In the preferred form the extrusion chamber is stationary and the member rotates therein about a longitudinal axis. The rotating member is fixed to or formed integral with the forward end of a shaft which is supported in a bearing located behind the extrusion chamber and is rotated by a suitable driving means engaging the shaft at a point remote from the extrusion chamber. The material to be extruded is fed into the machine at a point just in front of the shaft bearing and is converted into and maintained in the required plastic condition within the extrusion chamber by means of temperature control arrangements arranged in that portion of the machine which encloses the extrusion chamber.

The invention is further described with reference, by way of example, to the accompanying drawings which illustrate an extrusion machine, having the features of the invention, intended for the production of metal pipe and particularly for applying a lead sheath to an electric cable.

In these drawings:—

Figure 1 is a sectional elevation on the centre line of the machine;

Figures 2, 3, 4 and 5 are views in part section of the portion of the machine in which the extrusion chamber is located, representing four successive stages in one cycle of operation, Figure 2A, 3A, 4A and 5A are diagrammatic end views of the member located within the extrusion chamber corresponding to its positions as shown in Figures 2, 3, 4 and 5 respectively, viewed in the direction of the arrow A in each of the last mentioned figures.

Figure 3:
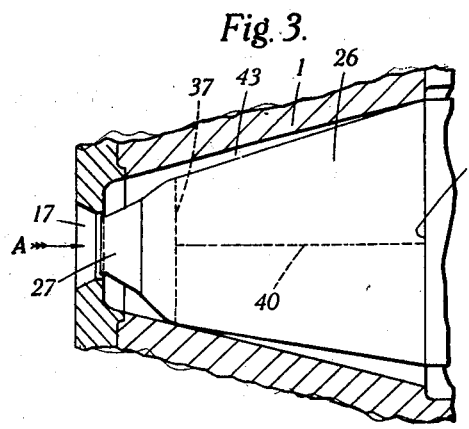
Figure 3A:
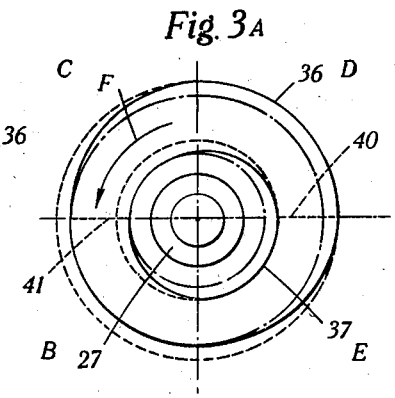

Figures 6 and 7 are views of a portion of a modified form of machine, the manner of representation being similar to that of Figure 3, and Figures 6A and 7A are diagrammatic end views in the directions of the arrows G and H in Figures 6 and 7 respectively of the arrangements shown in those figures, the manner of representation being similar to that of Figure 3A.

The machine as represented in Figure 1 comprises three main elements, namely, a forward die block 1, a rear housing block 2, and a rotatable shaft 3. The housing block is divided on a horizontal plane through the centre of the machine into two parts, the upper of which may be removed to gain access to the interior of the machine. The lower portion of the housing block 2 is formed with a flange footing 4 to facilitate the mounting of the machine on any convenient support. The die block 1 is attached to the housing block 2 by means of a number of screws 5 passing radially through a forwardly extending flanged portion 6 of the housing block 2 and engaging the rearmost portion 7 of the die block which is located in the recess formed by the flange portion 6.

Within the housing block 2 is carried a suitable bearing or bush 8 in which the rotatable shaft 3 is supported. Behind the bearing 8, a toothed driving wheel 9, keyed or otherwise secured to the shaft 3, is shrouded by a recessed portion 10 of the housing block 2 and is engaged by any convenient arrangement of power transmitting gears to rotate the shaft 3 in the bearing 8. A standard form of roller bearing 11, or combination of bearings, for the purpose of taking radial and axial thrusts between the shaft 3 and the housing block 2, is disposed at the rear end of the shaft 3 and is secured thereto by a lock-nut 12.

The die block 1 is bored to form an extrusion chamber 13 which tapers uniformly from a maximum rearmost diameter 14, the internal wall being concentric throughout its length with the axis of rotation of the shaft 3. The forward end of the tapering chamber 13 develops into a smoothly curving walled annular pressure-equalizing chamber 15 closed by a die-plate 16 which is secured to the front face of the die block 1 and in which is located centrally the outer die aperture 17 having a shape and dimensions in accordance with the characteristics of the pipe which it is required to extrude.

The die block 1 is formed with an annular cavity 18 in which a fluid may be circulated for the purpose of temperature control. In the arrangement illustrated, the die block 1 is surrounded by a ring main 19 from which extend pipe connections 20 to a number of jets 21 which pass through the front face of the die block and communicate with the interior of the cavity 18. By means of the jets 21 atomized water is projected into the cavity 18, thereby cooling the die block and, in consequence, any metal coming into contact with the inner wall of the tapering chamber 13. A pipe connection 22 provides an outlet for the circulating fluid at the lowermost point of the cavity 18.

Molten metal is fed into the machine under a gravity head by means of an entry 23 formed in the wall of the forward end of the housing block 2. From the entry 23 the molten metal passes into an annular space 24, formed partly in the die block 1 and partly in the shaft 3, located behind and in proximity to the extrusion chamber 13, at the point of its maximum diameter 14. From the annular space 24 the metal passes, in a manner to be described hereinafter, to the extrusion chamber 13 wherein it is cooled, becoming plastic in consequence, and is eventually extruded through the outer die 17. Between the point of entry of the metal into the machine and the cooling region of the die block 1 further temperature controlling means may be introduced. In the arrangement illustrated this is in the form of an induction coil 25 wound on the exterior of, and partly embedded in the die block.

The forward end of the shaft 3, being integral therewith or a separate member attached thereto, forms the member 26 located in the extrusion chamber 13 and referred to in the following description as the extruder 26. In operation the extruder 26 rotates about the axis of the chamber 13, thereby effecting forward movement of the metal within the chamber in a manner to be hereinafter described with reference to Figures 2 to 5A. The nose of the extruder 26 is curved to form one boundary of the pressure-equalizing chamber 15 and has a central aperture in which is located, with a driven fit, the tapered shank of an annular inner die 27. A central passage 28 extends throughout the length of the shaft 3 and in it is freely located a tube 29 which extends from the rear of the inner die 27 to project at the rear of the housing block 2. Over the rearwardly projecting portion of the central tube 29 is fitted a tapered sleeve 30 adapted to be screwed into a back plate 31 and thereby be contracted to grip the tube. The back plate 31 is fixed to the rear face of the housing block by means of several screws 32, whereby the backplate 31, tapered sleeve 30 and central tube 29 are held against rotation with the shaft 3. The forward end of the central tube 29 is supported within the passage 28 by means of a wear-resisting sleeve 33 which separates the relatively moving surfaces of the tube and shaft. The inner die 27, being a driven fit within the nose of the extruder, rotates with that member. To remove the die, the tapered sleeve 30 is unscrewed to release the tube 29 and the latter is driven forward to replace the die which can then be removed from the front of the machine. The tube 29, being stationary, separates the cable which is moving towards the forward dies from the inner surface of the rotating shaft, thereby eliminating possible damaging of the cable covering by the relatively moving shaft surface, and also serves to protect the cable against direct contact with the heated shaft.

Figure 2:
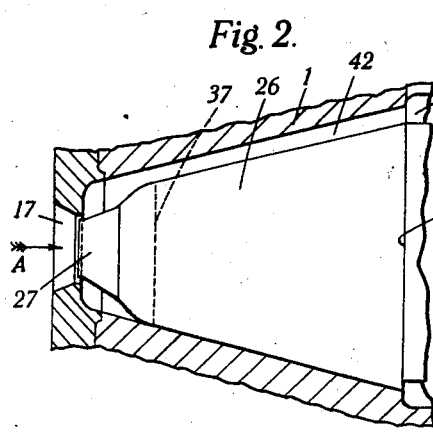
Figure 2A:
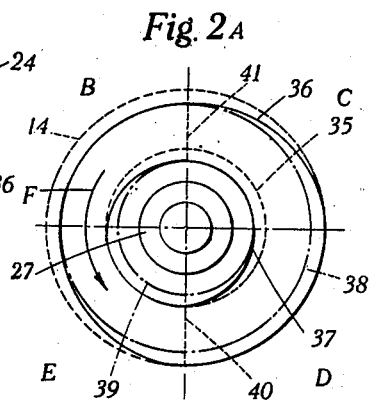

The particular form of the extruder 26 formed integral with, or otherwise attached to, the forward end of the shaft 3, is hereinafter described with particular reference to Figures 2 and 2A. The extruder may be considered as having been formed from a member having originally an exterior surface equivalent in shape and dimensions to that part of the wall of the extrusion chamber 13 extending between the rearmost and largest diameter 14 thereof, represented as a dotted circle in Fig. 2A, to a forward minimum diameter 35 also shown as a dotted circle in Fig. 2A. Between these two diameters 14 and 35 the wall of the extrusion chamber 13 is in the form of a right frustrum of a cone, and the surface of the extruder, between its extreme boundaries 36 and 37 which coincide in position with the two diameters 14 and 35 respectively, deviates from this shape to produce around the extruder a clearance space of such a shape that plastic metal located therein is urged towards the pressure-equalizing chamber 15 as the extruder rotates. For the purpose of explanation, the end view of the extruder shown in Fig. 2A has been divided into four quadrants, B, C, D and E, and in the operative movement the extruder is considered as rotating in the direction of the arrow F. At the rear end of the extruder there is line engagement only between the extruder and the wall of the extrusion chamber in the quadrant D; that is, at this end of the extruder and in this quadrant only the boundary 36 is circular and equal in diameter to the largest diameter 14 of the chamber wall. In the diametrically opposite quadrant B the boundary 36 has a smaller diameter, that is, of the broken circle 38 in Fig. 2A, and is in consequence separated from and parallel to the chamber wall in this quadrant. In each of the remaining quadrants C and E the shape of the boundary 36 is that of a transition curve from the larger to the smaller diameter. Considering now the forward end of the extruder, that is, the boundary 37, with reference to the diameter 35 of the chamber at this point, this boundary 37 coincides in the quadrant E with the diameter 35, there being at this end of the extruder, and in this quadrant, line contact only between the extruder and chamber wall. In the diametrically opposite quadrant C the boundary 37 has a diameter 39, less than that of the chamber wall diameter 35 and, in consequence, parallel thereto. In each of the remaining quadrants B and D the shape of the boundary 37 is that of a transition curve from the larger to the smaller diameter.

It is clear that the deviation of the boundaries 36 and 37 of the rear and forward edges of the extruder from the coincident diameters 14 and 35 of the extrusion chamber do not coincide in the same quadrants, but that the deviation at the rearmost boundary 36 leads that of the forward boundary 37 by 90° in the direction of rotation F. There is, in consequence, no surface contact between the extruder and chamber wall, and the only contact is a line contact on the rear boundary 36 in quadrant D, line contact on the forward boundary 37 in quadrant E, and line contact along the surface of the extruder between the lagging end of the portion of the boundary 36 in quadrant D and the leading end of the portion of the boundary 37 in quadrant E. The latter line of contact 40 lies in the plane which extends through the axis of rotation and separates the quadrants B and E from the quadrants C and D, that plane rotating with the extruder. Diametrically opposite to the line of contact 40 between the extruder surface and wall of the extrusion chamber and in the same above mentioned plane there is a line 41 of the extruder surface which is parallel to the cavity wall. Between the two boundaries 36 and 37 there is uniform tapering of the extruder surface and a progressive variation from the outline of the one boundary to the outline of the other boundary.

Figures 2 to 5, accompanied by the diagrammatic representations Figs. 2A to 5A, represent four positions of the extruder during one complete revolution, namely at the beginning of the revolution, after a quarter of a revolution, half a revolution and after three quarters of a revolution. The rearrangements of the quadrants B, C, D and E in successive Figures 2A to 5A indicate the direction and amount of movement of the extruder during each period and the location of its surfaces with reference to the chamber wall.

It is clear that at any time in the axial plane through the line of contact 40 there is maximum clearance between the extruder and the chamber wall at the position of the line 41 and a minimum clearance, that is actual contact, between the two surfaces at the line 40 diametrically opposite. It is also clear that at any given point the clearance will progressively increase after the passage of the line contact 40 and will progressively decrease after the passage of the line 41.

Molten metal which flows into the annular passage 24 at the rear of the extruder 26, passes therefrom into the clearance space between the extruder and the wall of the extrusion chamber. The temperature control of the die block is such that in this clearance space the metal is changed into the plastic condition necessary to permit it to be extruded. Plastic metal located between the chamber wall and the surface of the extruder in quadrants C and D will be subjected to the pressure of the advancing extruder surface in the sense that this surface makes a small angle with the chamber wall, with its rearward edge leading, as it advances to close the clearance around the extruder. Pressure will act on the metal at any point in quadrants C and D in forward direction and at an angle to the tangent to the chamber wall at this point. This pressure will have a tangential component tending to move the metal circumferentially and an axial component tending to move it axially. Under the axial component the metal will be moved towards the pressure-compensating chamber 15 and will eventually issue as an extruded section between the inner and outer dies 27 and 17 respectively. Molten metal will continuously move into the clearance space behind the line of contact 40, where the pressure will be a minimum, to replace the axially displaced metal.

The action of the rotating extruder upon the metal in the clearance space in any one radial plane is further described with reference to Figures 2 to 5A. At the commencement of the rotation of the extruder there is a maximum clearance 42 (Fig. 2) on the upper side of the extruder. During the first quarter of a revolution, that is, during the passage of the quadrant C through the plane of section of Figures 2, 3, 4 and 5, the boundary 37 at the forward edge of the extruder remains equidistant from the extrusion chamber wall, and the boundary 36 at the rear edge approaches the wall to make contact therewith at the end of the quarter revolution. The clearance space 42 has thus been gradually reduced to a space 43 (Fig. 3) of half the area by the uniform rotation of the line of surface of the extruder lying in the axial plane about the point of the forward edge of the extruder lying in this plane. During a further quarter of a revolution to the position shown in Fig. 4, that is during the movement of quadrant D of the extruder through this axial plane, the boundary 36 at the rear edge remains in contact with the chamber wall, and the boundary 37 progressively approaches the wall. That is to say, the line of surface of the extruder lying in this axial plane now turns about the rearmost point of engagement, thereby gradually closing the clearance towards the forward end until at the end of half a revolution (Fig. 4) there is no clearance. At this point the line of contact 40 lies in this axial plane and all the plastic metal which at the commencement of the cycle was located between the extruder and the chamber wall in quadrants D and C has been displaced by the pressure of the advancing extruder surface, partly circumferentially and partly by extrusion into the pressure-equalizing chamber 15. During further rotation of the extruder the clearance is again reformed in this plane of reference by a reverse process. Thus after three quarters of a revolution (Fig. 5) the clearance has been half re-formed (44, Fig. 5) from the rear edge of the extruder to the point of engagement of the boundary 37 with the chamber wall during the passage of quadrant E.

At the end of the revolution (Fig. 2) the clearance has returned to a maximum (42, Fig. 2) after the passage of quadrant B through this plane by the progressive retraction of the boundary 37 at the forward edge of the extruder from the chamber wall.

It will be clear that the pressure exerted on the plastic metal by the extruder acts always in a forwardly direction and there is no pressure acting against the entry of molten metal into the annular space 24 at the rear of the extruder. In consequence, there is no pressure tending to force molten metal between the shaft and its supporting bearing 8 other than the gravity head under which metal is fed to the machine.

The movement of plastic metal forward in the extrusion chamber is effected by the particular relative configurations of the wall of the chamber and the surface of the extruder whereby the continuous and uniform change of section of the clearance space in any radial plane produces an extrusion pressure. It is not essential that the extrusion chamber be of tapering form, as shown in the example illustrated to achieve this object. The extrusion chamber may be of cylindrical form or it may taper towards its rearmost end. In such modification the extruder will approximate to a similar shape, its peripheral configuration being, however, such as to form a surrounding clearance space having the required cyclically varying cross-section.

Figures 6 and 6A indicate the arrangement of an extrusion chamber and extruder in which the extrusion chamber wall is a concentric cylinder about the axis of rotation of the extruder 46. The extruder 46 is represented in a position similar to that of the extruder 26 in Figures 3 and 3A, that is, after having moved through a quarter of a revolution in the direction J (Figure 6A) from an initial position similar to that shown in Figures 2 and 2A. The uniform diameter of the extrusion chamber wall 47 (Figure 6) is indicated in Figure 6A by the broken circle 47. The shape of the rear edge 48 (Figure 6) of the extruder 46 is indicated in Figure 6A by the line 48, this being a full line in quadrants C and D and a dotted line in quadrants B and E. The shape of the forward edge 49 (Figure 6) of the extruder, that is, at the boundary between the extrusion chamber and the pressure equalizing chamber 50, is indicated by the full line 49 in Figure 6A. As shown in Figure 6A the rear edge 48 of the extruder is in contact with the chamber wall 47 only in quadrant D, and the forward edge 49 is in contact with the wall 47 only in the quadrant E, that is the forward edge lags behind the rear edge (having references to the direction of rotation J) by 90°. In quadrant B, that is, diametrically opposite to quadrant D, the rear edge 48 is spaced apart from and parallel to the chamber wall 47, having in this quadrant a diameter represented by the broken line 51. In the remaining quadrants C and E the rear edge 48 of the extruder has the form of a transition curve between its diameters in quadrants B and D. In quadrant C, that is diametrically opposite to quadrant E, the forward edge 49 is spaced apart from and parallel to the chamber wall 47, having a diameter in this quadrant represented also by the broken line 51. In the remaining quadrants B and D the forward edge 49 of the extruder has the form of a transition curve between its diameters in quadrants C and E.

From the above it will be seen that in the case of a cylindrical extrusion chamber, the forward and rear edges of the extruder have similar shapes but are displaced so that the rear edge leads the forward edge in the direction of rotation J. The extruder surface will always be in contact with the wall of the extrusion chamber along its rear edge 48 in quadrant D, its forward edge 49 in quadrant D, and along a line 60 which is parallel to the axis of rotation and which represents the common boundary of the portions of the extruder surface located in those quadrants.

Figures 7 and 7A indicate the arrangement of an extrusion chamber and extruder 52 in which the extrusion chamber wall 53 is concentric about the axis of rotation of the extruder 52 and tapers towards its rearward end. The extruder 52 is represented in a position similar to that of the extruder 46 in Figures 6 and 6A, that is, after having moved through a quarter of a revolution in the direction K (Figure 7A) from an initial position similar to that shown in Figures 2 and 2A. The diameter of the extrusion chamber wall 53 at its rearward end is indicated in Figure 7A by the broken line 54. The shape of the rear edge 55 (Figure 7) of the extruder 52 is indicated in Figure 7A by the dotted line 55. As shown in Figure 7A the rear edge 55 of the extruder is in contact with the chamber wall at its diameter 54 only in quadrant D. In quadrant B, that is, diametrically opposite to quadrant D, the rear edge 55 is spaced apart from and is parallel to the chamber wall diameter 54 having in this quadrant a diameter represented by the broken line 56. In the remaining quadrants C and E the rear edge 55 of the extruder has the form of a transition curve between its diameters in quadrants B and D. The largest diameter of the extrusion chamber wall 53 at its forward end, that is, at the boundary between the extrusion chamber and the pressure equalizing chamber 57 is indicated in Figure 7A by the broken line 59. The shape of the forward edge 58 (Figure 7) of the extruder is indicated by the full line 58 in Figure 7A. The forward edge 58 is in contact with the chamber wall 53 at the diameter 59 in quadrant E only. It is clear, therefore, that the forward edge lags behind the rear edge (having reference to the direction of rotation K) by 90°. In quadrant C, that is, diametrically opposite the quadrant E, the forward edge 58 is spaced apart from and parallel to the chamber wall having a diameter in this quadrant which is represented also by the broken line 54. In the remaining quadrants B and D the forward edge 58 has the form of a transition curve between its diameters in quadrants C and E.

The extruder surface will always be in contact with the wall of the extrusion chamber along its rear edge 55 in quadrant D, its forward edge 58 in quadrant E, and along the line 61 which lies in that plane through the axis of rotation which separates quadrant D from quadrant E.

The manner of operation of these last two forms of construction is similar to that already described with reference to the Figures 1, 2 and 5A and a description having reference to those figures applies equally to Figures 6–7A. The relative angular relation between the eccentric forward and rearmost boundaries 36 and 37 of the extruder may be rather more or less than 90°, and furthermore, the positions of change of curvature of the extruder surface may be separated by rather more or less than a quarter of a revolution, without departing from the effectiveness of the apparatus. The line of contact 40 between the extruder surface and chamber wall may also be extended to a surface of contact with the object of reducing the stresses in the contacting metal surfaces. Furthermore, where it is required to extrude pipe of relatively large dimensions the extruder may be of such a shape that the cycle of operations occurs two or more times in any axial plane during one revolution of the extruder.

Other modifications may be made without departing from the essential features of the invention. The temperature control of the die block and other parts of the apparatus may be effected by any suitable known cooling and heating means. The die block may be coupled to the housing block by means of tie bolts. The extruder may be in the form of a collar, having the necessary surface contour, and bored accurately to engage the end of the shaft which would be accurately machined to a complementary form. Other sections than cable sheaths may be extruded, and the shaft and inner die will require to be hollow only if a cable or similar body is required to project or pass continuously through the inner die.

What I claim as my invention is:—

1. An apparatus adapted to extrude plastic material from an extrusion chamber through a die located at the forward end of the chamber, comprising a member located within the extrusion chamber, means for effecting relative rotation of the chamber and member, the chamber wall and member being in contact along a line adapted to move progressively round the axis of relative rotation as the said relative rotation takes place, the end of the line of contact at the rearward part of the extrusion chamber projecting, in the direction of its progressive movement, in advance of the end thereof in the forward part of the chamber, and the chamber wall and the surface of the member being inclined to each other at a small angle as they approach the line of contact.

2. An apparatus adapted to extrude plastic material from an extrusion chamber through a die located at the forward end of the chamber, comprising an extrusion chamber concentric about a longitudinal axis, a member located therein, means for effecting relative rotation of the chamber and member, and the surface of the member having such a contour that, as relative rotation takes place, the sectional shape of the clearance space between the member and chamber wall in any plane through the axis of rotation is progressively reduced from a maximum to zero first by the turning of the line of surface of the member in that plane about its forward end until the rearward end is in contact with the chamber wall, then by the turning of the line about its rearward end until the line closes completely on the chamber wall, and the sectional shape is then progressively increased to the maximum first by the turning of the line about its forward end away from the chamber wall and then by the turning of the said line about its rearward end away from the chamber wall.

3. An apparatus adapted to extrude plastic material from an extrusion chamber through a die located at the forward end of the chamber, comprising a rotatable member located within a stationary extrusion chamber so that a relatively narrow clearance space extends around a large part of the surface of the member, the surface of the member and the wall of the extrusion chamber tapering towards the forward end thereof, a line of contact between the same surface and said wall extending from the rear to the forward end of the member and having its rear end projecting in advance of its forward end as it rotates with the member, the said wall and said surface meeting at a small angle on the leading side of the line of contact so that material is squeezed and caused to move forward as the member rotates, means for feeding material into the extrusion chamber at its rear end, and a pressure equalizing chamber formed in the forward end of the extrusion chamber to receive material pressed forward therefrom before the material passes through the die.

4. An apparatus adapted to extrude plastic material from an extrusion chamber through a die located at the forward end of the chamber, comprising a rotatable member located within an extrusion chamber so that a relatively narrow space surrounds a large part of the surface of the member, the extrusion chamber being tapered towards the forward end, a line of contact between the said surface and the wall of the extrusion chamber extending from the rear to the forward end of the member and the rear end of the line of contact projecting in advance of its forward end in its direction of rotation with the member, the said surface and said wall meeting at a small angle on the leading side of the line of contact so that material is squeezed and caused to move forward as the member rotates, a cavity at the rear of the extrusion chamber communicating with the said narrow space at all points around the member and serving for the introduction of liquid material thereto, and temperature controlling means associated with the extrusion chamber to render and maintain the material plastic therein.

RICHARD GLEAVE NORRIS.